May 20, 1958 — L. J. HAYHURST ET AL — 2,835,326
WRAPPER CUTTING APPARATUS

Filed March 24, 1955 — 2 Sheets-Sheet 1

INVENTORS:
Lewis J. Hayhurst
Frank O. Coffey
By Soans, Gleister and Anderson
Attys.

May 20, 1958

L. J. HAYHURST ET AL 2,835,326

WRAPPER CUTTING APPARATUS

Filed March 24, 1955

INVENTORS:
Lewis J. Hayhurst
Frank O. Coffey
BY Soans, Glaister and Anderson
Attys.

United States Patent Office 2,835,326
Patented May 20, 1958

2,835,326

WRAPPER CUTTING APPARATUS

Lewis J. Hayhurst and Frank O. Coffey, Glenview, Ill., assignors to National Dairy Products Corporation, a corporation of Delaware Application March 24, 1955, Serial No. 496,370

2 Claims. (Cl. 164—84.5)

This invention relates generally to a method and apparatus for cutting wrapping materials and, more particularly, it relates to a method and cutting device for cutting wrappers with converging sides from a continuous strip of material.

In the wrapping of wedge-shaped pieces of cheese, wrapping material in the shape of a trapezoid has been found to be satisfactory for providing a neatly wrapped package. In the past, it has been the practice to die-cut these cheese wrappers from rectangular or square sheets of wrapping material. This practice produced the desired shaped trapezoidal piece of wrapping material, but in addition, two extra pieces were formed from each sheet. These extra pieces were not of proper shape and could not be used for wrapping cheese wedges and, consequently, were regarded as waste.

In addition, the die-cut wrappers have to be provided with interleaves to make the sheets readily separable. As a result, the interleaf material is also waste when the wrappers are used.

Thus the practice of die cutting wrappers has resulted in substantial wasting of material with consequent relatively high cost. Accordingly, the principal object of the present invention is to provide a method and cutting device for providing a series of pieces of wrapping material having a pair of converging sides from a continuous strip of wrapping material. Further objects and advantages of this invention will become apparent from the following description and drawings, in which.

The cutting apparatus of the invention comprises a frame 5, on which various parts of the apparatus are mounted, and means 7 for supplying a continuous strip 8 of wrapping material. In addition, the apparatus includes a pair of spaced cutting knives 9 and 11, which are disposed in a particular relation, to be hereinafter described, for cutting wrappers of desired shape from the continuous strips.

Figure 1:
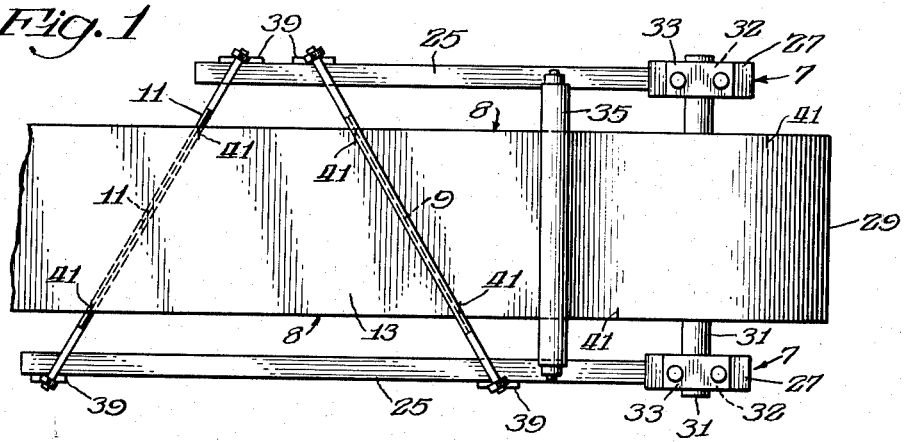
Figure 1 is a plan view illustrating the apparatus of the invention, a roll of wrapping material being shown in the apparatus.
Figure 2:
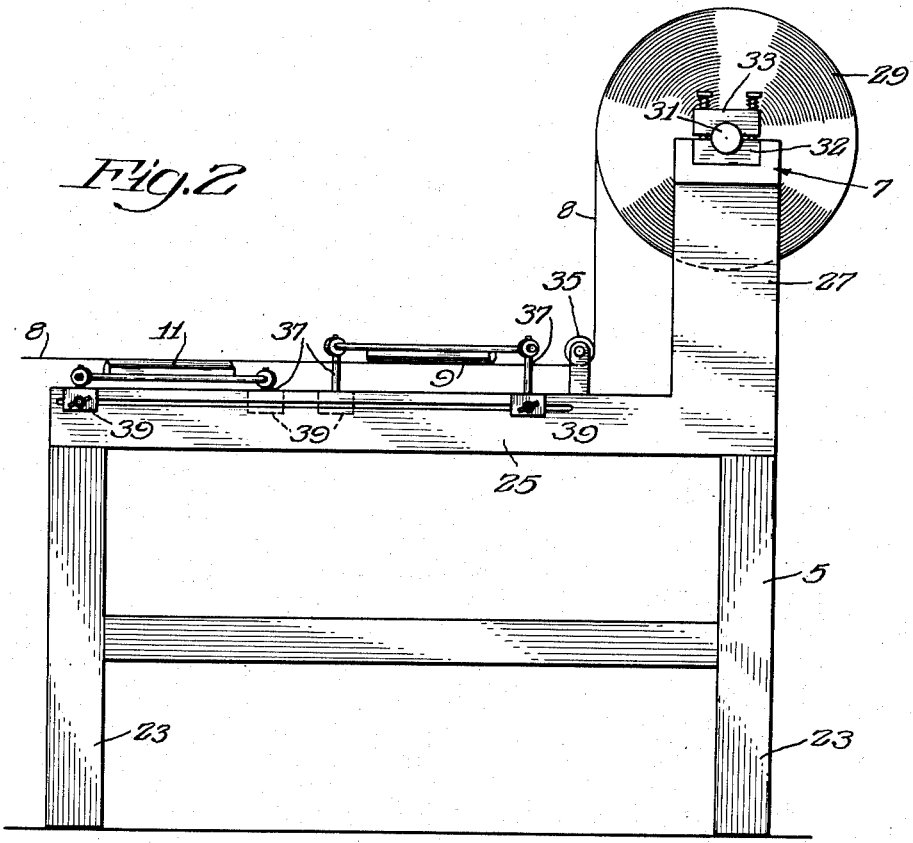
Figure 2 is a side elevation of the cutting apparatus shown in Figure 1.
Figure 3:
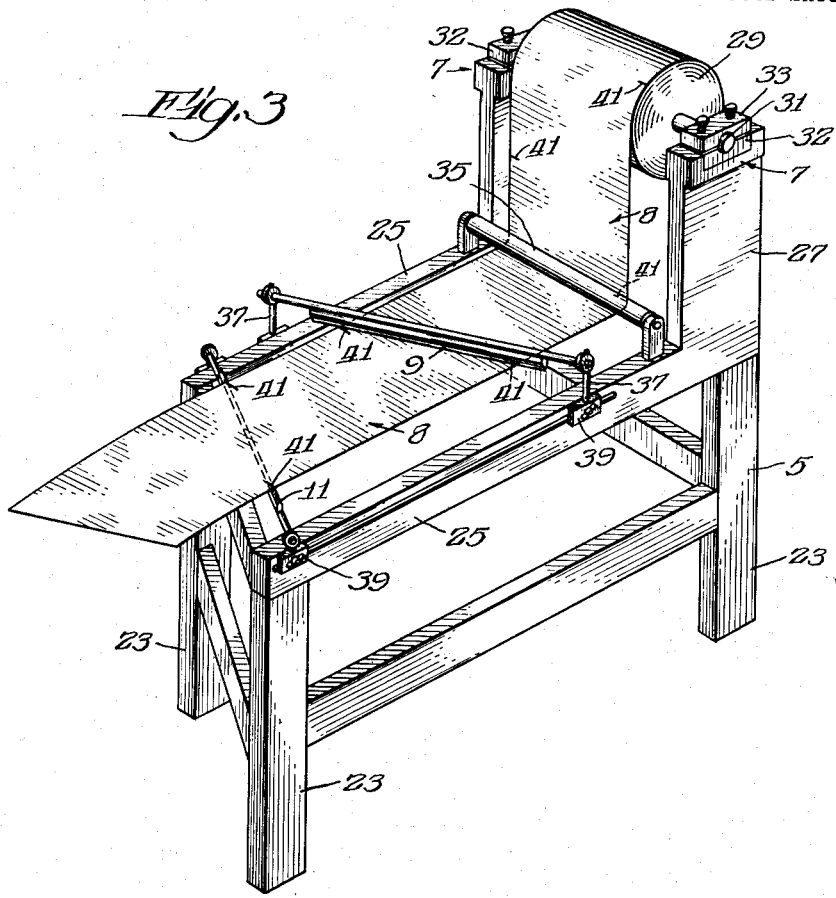
Figure 3 is a perspective view of the cutting apparatus shown in the previous figures.
Figure 4:
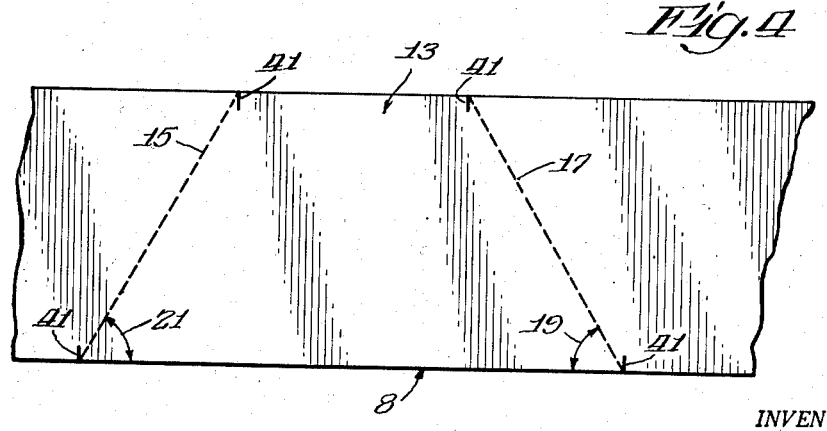
Figure 4 is a plan view of a section of the material, the lines which are cut by the apparatus of the invention being shown by dotted lines.

As above indicated, the present invention is adapted for cutting wrappers from a continuous strip, the wrappers having converging sides. Such a wrapper is shown at 13 in Figure 4, the converging sides 15 and 17 being indicated by dotted lines. However, the apparatus is only adapted for cutting successive wrappers, the sides of which intercept the same edge of the continuous strip at the same angle. In other words, angle 19 is equal to angle 21 in Figure 4.

The frame 5 is of fabricated construction and generally comprises legs 23 which support a pair of spaced longitudinally extending members 25 having upwardly extending sections 27 for carrying the means 7 for supplying the continuous strip 8. The longitudinal members are interconnected by suitable transversely extending members (not shown).

As above pointed out, the means 7 for supplying the continuous strip 8 is supported on the frame 5, in the illustrated embodiment, and includes a roll 29 of wrapping material which is supported on a transversely extending shaft 31 that is journalled in a pair of suitable bearings 32 which are mounted on the upwardly extending sections 27 of the frame 5. A brake 33 may engage the shaft 31 to prevent oversupplying of the strip 8 due to inertia of the roll and to provide a tension on the strip 8. The strip supplying means 7 further includes a guide roll 35 which is journalled on the frame 5.

The knives 9 and 11 are adjustably mounted on the frame 5 in longitudinally spaced, converging relation, relative to each other. In the illustrated embodiment, each end of each knife may be moved longitudinally on the frame 5 and locked in a selected position. This permits the knives to be adjusted to cut different sized wrappers and to be adjusted for accurately cutting wrappers of predetermined dimension.

The ends of the knives 9 and 11 have suitable brackets 37 at each end which engage the frame 5. The brackets are provided with conventional locking means 39 for securing the knives 9 and 11 in a predetermined position.

The knives 9 and 11 are not only spaced in a longitudinal direction but are also spaced in a vertical direction. In this connection, the knife 9 located nearest the roll 29 is disposed above the knife 11. Accordingly, the continuous strip 8 is threaded under knife 9 and over knife 11.

In the operation of the cutting apparatus of the invention, an end of the continuous strip is pulled from the roll 29 and threaded under the idler roll 35 and under the knife 9. The wrapping material is then drawn forward over the knife 11.

The wrapping material is provided with marks 41 (Figure 4) located at predetermined points along the edge of the strip 8, the positioning of these points determining the size of the wrapper. When a mark is aligned with the knife 11, the wrapping material is pulled downward so that it is cut along the line 15 (Figure 4) which corresponds to the edge of the knife 11. The operator then pulls the wrapping material upward, thereby severing the material along line 17 (Figure 4) and providing a wrapper of desired size. Thus, a wrapper is cut from the strip which has a size determined by the location of the two knives 9 and 11 and the opposite sides of the strip 8. A similar size piece may then be made by pulling the strip forward until a mark 41 overlies the first cutting edge and then pulling downward. This operation may be repeated as the pieces of wrapping material are needed, each cut resulting in the desired size sheet of wrapping material without any waste.

It will be seen that from this operation there is no waste material and that the need for interleaves is obviated. Furthermore, wrappers of desired size are immediately available and the minimum handling of the wrapper in the method of the invention minimizes the possibility of contaminating the wrapper.

The various features of the present invention which are believed to be novel are set out in the following claims.

We claim:

1. Apparatus for cutting wrapping material for wedge shaped articles from a continuous strip of material comprising, in combination, an elongated frame, a roll on said frame providing a continuous strip of wrapping material longitudinally of said frame, brake means engaging said roll, a pair of spaced converging knives disposed in different planes on said frame, the cutting edge of the respective knives being positioned in cutting engagement against opposite faces of said strip said knives converging towards one another and intersecting the longitudinal axis of said frame on the same side of said axis at the same angle.

2. A method for providing wrappers having converging sides, from an elongated strip of wrapping material which method includes the steps of marking the wrapping material at predetermined, longitudinally spaced points, drawing the strip of wrapping material forward to superpose one mark over a first cutting means which extends diagonally of said strip and to cause the other mark to underlie a second spaced cutting means which extends in converging relation to said first cutting means and forms the same angle with said strip, pulling said strip down along said first cutting means to thereby cut the strip along a diagonal line, pulling said strip up along said second cutting means to thereby cut said strip along another diagonal line.

References Cited in the file of this patent

UNITED STATES PATENTS

| | | |
|---|---|---|
| 183,112 | Bischof | Oct. 10, 1876 |
| 356,796 | Colley | July 5, 1887 |
| 1,002,599 | Moore | Sept. 5, 1911 |
| 1,708,725 | Huempfner | Apr. 9, 1929 |
| 2,354,294 | Schimmel | July 25, 1944 |
| 2,642,939 | Oldenburg et al. | June 23, 1953 |